United States Patent [19]

Lingo, Jr.

[11] Patent Number: 4,645,594
[45] Date of Patent: Feb. 24, 1987

[54] CONVERTER FOR BIODEGRADABLE MATERIAL

[76] Inventor: William J. Lingo, Sr., 4418 Procuniar Dr., Huber Heights, Ohio 45424

[21] Appl. No.: 724,861

[22] Filed: Apr. 19, 1985

Related U.S. Application Data

[63] Continuation-in-part of Ser. No. 574,393, Jan. 27, 1984, abandoned.

[51] Int. Cl.$^4$ ............................................. C02F 11/04
[52] U.S. Cl. ..................................... 210/170; 210/180; 210/532.1; 210/539
[58] Field of Search ............... 210/603, 608, 613, 170, 210/319, 320, 532.1, 539, 540, 179–181

[56] References Cited

U.S. PATENT DOCUMENTS

| | | | |
|---|---|---|---|
| 4,157,958 | 6/1979 | Chow | 210/603 |
| 4,256,837 | 3/1981 | Fluri et al. | 210/608 X |
| 4,323,367 | 4/1982 | Ghosh | 210/603 X |
| 4,372,856 | 2/1983 | Morrison | 210/608 X |

*Primary Examiner*—Tom Wyse
*Attorney, Agent, or Firm*—Biebel, French & Nauman

[57] ABSTRACT

An anaerobic digester system for biodegradable materials comprises a closed generally cylindrical digester tank supported with its axis vertical and with the majority of its height below ground. The tank includes a gas collecting region at its top above a predetermined normal liquid level within the tank. Spaced inlet and outlet openings are provided near the bottom of the tank and substantially straight inlet and outlet channels are connected to those openings providing a flow inlet to and a flow outlet from the digester tank, and a deflector surroundes the outlet opening to inhibit direct flow from the inlet to the outlet while allowing digested material to proceed to the flow outlet, and an agitating device is fitted in the tank. An input basin, having a relatively small volume with respect to the tank, is supported with its bottom at the predetermined normal liquid level in the digester tank, and is connected to the inlet channel for gravity flow of material loaded into the input basin under atmospheric pressure into the digester tank. An outlet basin, having a volume no less than said input basin, is located with its top approximately at the same level as the normal liquid level of the digester tank and is connected to the outlet channel. Anaerobically digestable material may be loaded into the input basin and will proceed by gravity and atmospheric pressure into the digester tank, the effluent of digested material will flow into the outlet basin, and gases resulting from the digestion will rise through the material and agitate the same and then proceed to the gas collecting region where the gases can be removed.

7 Claims, 2 Drawing Figures

U.S. Patent  Feb. 24, 1987  4,645,594
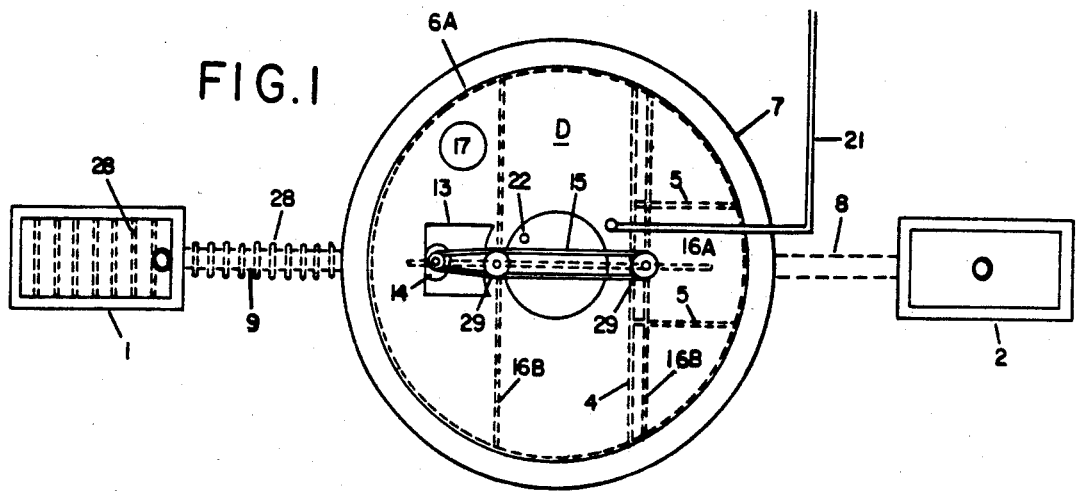
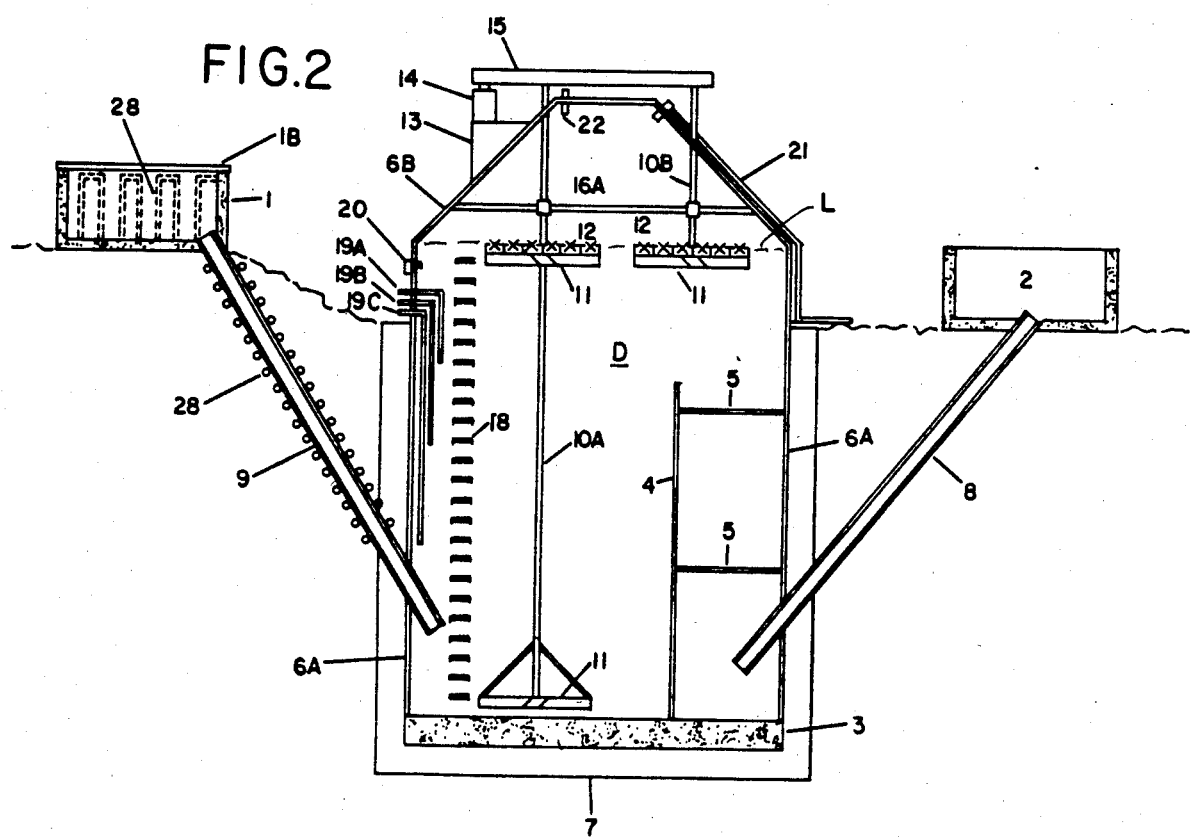

CONVERTER FOR BIODEGRADABLE MATERIAL

CROSS-REFERENCE TO RELATED APPLICATION

This application is a continuation-in-part of application Ser. No. 574,393, filed Jan. 27 1984 and now abandoned.

BACKGROUND OF THE INVENTION

The anaerobic/fermentation of biodegradable material is relatively well known and generally understood by those knowledgable in the art. Briefly, the exclusion of oxygen will enable methogenic bacteria to develop. Within the process of their development, methane gas, carbon dioxide, hydrogen sulfide, amnonia and other gasses are given-off from the biodegrading mass.

Prior to this invention, the state of the art had been centered around designs low in height, wider and longer than they are tall, and requiring many tubes, conduits and transfer pipes to move the mass from one area of digestion to another. Such designs require meters, dials, gauges, tubes, valves and other paraphernalia (see U.S. Pat. Nos. 2,572,767; 2,605,220; 2,772,233; 2,777,815; 2,661,332; 3,981,800; 4,046,551; 3,981,803; 4,092,338; 4,274,838; 4,057,401; 4,100,023; 4,366,059; and 4,378,437). Such designs prevent, restrict, or impede the natural volcanic action inherent in the vertical digestion processes.

It is common knowledge that as bacteria attack fresh matter fed into an anaerobic digester, carbon dioxide is formed as a by-product of this initial action. As the carbon dioxide is formed, the initial content of oxygen is consumed. This consumption of oxygen enables methogenic bacteria to propagate and develop. It is at this stage of the inherent process in anaerobic digestion that the methogenic bacteria become dominant. The methogenic bacteria, in turn, attack the material that has been freed of its oxygen content. This action by the methogenic bacteria upon biodegradable material results in the production of methane gas and other gasses.

As the methane is forming in the material being attacked by the methogenic bacteria, the material being attacked begins to rise to the surface of the mass of material contained within the digesting area, much in the same manner as a balloon filled with helium will rise into the sky until the capacity of the balloon is exceeded by the pressure of the gas expanding within due to the reduced atmospheric pressure at the higher elevation, and thereby exploding the balloon. The gasses escape and the balloon, now heavier than the atmosphere without the lighter-weight gas, falls back to the surface. So, too, does the material being attacked by methogenic bacteria. As the gas expands within the cellular structure of the biodegradable material, the mass begins to rise from the bottom of the digester, due to the fact that the molecular weight of methane is only 0.553 and, therefore, lighter than the surrounding material. When the expanded volume of the methane gas within the cellular structure reaches the point at which the cellular structure can no longer retain the expanding gas, the cellular structure literally explodes, thereby releasing the methane gas and other gasses, and allowing the cellular structure to fall to the floor of the digester. This action continues until the biodegradable material is unable to provide the methogenic bacteria with biodegradable elements to act upon in the methogenic process.

The prior art (see list of patents, above) with its use of tubes and recirculating gas jets, does not allow this natural volcanic action to take place to the fullest extent it is capable and the action is further restricted by low, wide and long designs as are illustrated and described.

Another problem inherent in the prior art is that anaerobic fermentation/digestion unalterably creates 'scum'. . . . a slimy, adhering, accumulation of bacterial plaque . . . which is a natural by-product of the inherent action. This scum will adhere to most surfaces with which it comes in contact. Therefore, a problem not solved by prior inventions is the clogging of designed jets, tubes and internal heating pipes and conduits, and the coating of said heating pipes, tubes, and conduits, thereby reducing their design efficiency.

Whenever there is a pipe, conduit or transfer channel for the purpose of agitation, transferring of material or interior heating, there is inherently a cause for maintenance, a reduction in operating efficiency, and the inevitable cost, shutdown, lowering of operating efficiency and reduction in production. Pipes, conduits, and channels clogging in an anaerobic digester/fermentation tank eventually lead to the system being shut down to repair, replace, or adjust the system to restore it to its designed efficiency. Such a shutdown of activity results in a loss of production and a mandatory interruption in the process.

Another problem exists in the prior designs for single area digesters (U.S. Pat. Nos. 2,605,220; 2,772,233; 3,981,803; 4,092,338; 4,100,023; 4,233,155; and 4,274,838), in that none has incorporated a means to deflect incoming material away from the exit channel, thus allowing undigested material to be prematurely expelled from the digester.

A further problem of prior digesters has been the need for intensive management. The overabundance of valves, dials, guages, switches, transfers and operating paraphernalia demand constant observation and attention. Prior U.S. Pat. Nos. 2,572,767; 2,605,220; 2,661,332; 3,981,800; 4,406,551; 4,057,401; 4,100,203; 4,233,155; and 4,366,059 have been predicted upon the attempt to control some segment of the process, and therefore, those designs tend to complicate the apparatus and the process making it mandatory to specifically manage the process. The flaw in such a requirement is that if one step is delayed, or accellerated, the entire process is interrupted until a specific management step is initiated. This is most prevalent in designs that require more than one area of activity/processing.

In actuality, the entire process of anaerobic digestion and the production of methane gas and other gasses from such action is interdependent upon sequentially related factors. Any attempt to interfere with the natural progression of bacterial action will only delay, or stop, the object of the invention. At the very least, a guarantee of less than maximum potential is effected in systems so designed.

A further problem in all prior state of the art systems is that they have no designed means to exactly control the amount of new material fed into the system, as it relates to the volume of the system, without an excessive amount of technologically advanced, on-site management and/or additional expensive equipment and operating paraphernalia that is subject to breakdown, maintenance and repair/replacement, with attending cost and reduction in efficiency. This failure in the prior art virtually eliminates the use of such systems by people not skilled in such control management for the production of beneficial gasses or the object for which they were invented.

A further problem in the prior art has been inability to retain the material for a sufficient period of time to eliminate unwanted aerobic pathogens and viruses. Such a benefit would enable the material used for digestion to include human excrement found in municipal sewage systems, without fear of spreading disease, and would include the benefit of effectively sterilizing the digested residue against the passage of live insect larva, aerobic disease pathogens and viruses, all of which are present where digester material is accumulated for processing. Without a means to deflect freshly added material away from the point at which said material is to pass out of the digester, no assurance is given that the material will be retained long enough in the digesting area to rid the substance of aerobic pathogens and viruses.

Further, no enhancing of the fertilizer value will be effected. Because of the inherent process of anaerobic digestion, the residue (the material expelled from the digester about it has been subjected to the complete anaerobic process), if retained in the process long enough, will be changed to a more beneficial pH, and have more available nitrogen and more available potassium for the fertilization of plant life.

SUMMARY OF THE INVENTION

It is important that of the converter system of the present invention have a vertical action, that is, an upward progression of the generated gases, so as to enhance the natural volcanic action of the digesting process. This vertical action design promotes internal, continuous, natural and unimpeded agitation and mixing of the bio-mass contained within the digesting area. The design also enhances the action of the cellular expansion of the mass during the production of methane and other gases, by allowing sufficient vertical height that the larger masses of digestable material containing cellular structures can attain a higher elevation, and corresponding lower ambient pressure, so the gas can sufficiently expand beyond the capacity of the cellular structure to contain it, thereby completing the volcanic action and causing the cellular structure to fall to the bottom of the digester.

It is a further object of the present invention to have no internal channels, tubes or jets that are subject to clogging, that can not be maintained from external access and without shutting-down the operation of the digester. The converter system of this invention is so designed as to eliminate the possibility of clogging of internal and inaccessable tubes, channels and conduits, jets and valves, by the inherent accumulation of bacterial plaque (scum) that is unavoidable in the anaerobic process. The entrance channel and the exit channel are designed as straight channels which can be maintained from outside the digester. Neither require any interruption of the anaerobic process.

Another object of this invention is to shred any accumulation of scum created by the anerobic process. This is accomplished by the design of a shredder device located at the surface of the working mass inside the digester, and so arranged that at selected times the shredder is rotated to effectively turn the accumulation of scum into a blendable mass that is subsequently mixed into the slurry and ejected from the digester in the normal sequence. Such a mechanical shredder effectively prevents any substantial accumulation of surface scum by intermittantly and selectively shredding any accumulation of scum, rather than continuously shredding scum, with up to a 99.9% savings in energy. There is further, a minimumal distrubance of the natural anaerobic process.

It is a further object of the converter system to effectively blend the various materials, on an intermittant and selective basis as needed, to assist the natural process only when the natural process is subjected to much an unusual temperature extreme, or a radical pH alteration, that the natural mixing action of the volcanic action is suppressed. At such rare times, the operator can elect to manually initiate the mixing of the ingredients to assist in the formation of volcanic action, and/or the mixing of shredded scum. Such an arrangement saves much of the energy expended by some continuously agitated digesters and allows the methogenic bacteria to work upon the bio-mass with as little interference as practical. Mixing is accomplished by the attachment of mixing blades mounted such that when the shaft is rotated, the bottom blade directs the material upwards and the top blade directs the movement of the slurry downwards.

A further object of the converter system is to provide an input deflector which prevents the premature expulsion of undigested material from the digester thereby assuring retention of freshly added material for the methogenic bacteria to work upon. Since the amount of the expelled material is the same as the volume of fresh material added, by deflecting away fresh material from the exit flow channel, the system guarantees that only totally digested material is expelled.

The novel converter system is designed as a low technology device, requiring minimal orientation to operate and no extranious equipment not ordinarily found at locations where the converter may be operated.

A major object and advantage of the invention is the design and incorporation of the portion-controlled fill-pit, with an optional passive solar lid, that is sized specifically with respect to the digester tank, preferably to one-fortieth the capacity of the digester. Such a portion-controlled fill-pit eliminates the chance of an operator putting too much, or to little, material into the digester in any one loading period. The procedure is to lift the lid, fill the pit to over-flowing, and close the lid. The entire process will take place, in exact proportion to its capacity, sequentially timed by nature. The design of the fill-pit elevation, in relation to the top of the wall of the residue basin, controls the elevation of the working surface within the digester by creating the natural hydraulic forces that act to load the digester itself without the use of power assistance. The loading process is no more technologically advanced than filling a bucket with a shovel. Because the floor of the portion-controlled fill-pit is on the same elevation as the top of the working level of the digester and the top of the exit basin used to receive digested material after the anaerobic process, and because the solids content of freshly loaded material is between 3% and 15%, the fresh material is forced downward through the entrance channel into the digester by atmospheric pressure, against the pressure (which is low) of the generated methane gas and other gases, and creating a slurry level in the digester equal to that of the incoming slurry and the exiting material. This forces the digested material that has settled to the bottom of the digester, between the deflector and the exit, to be forced out the exit channel into the residue or exit basin. The design of the portion-controlled fill-pit establishes the same elevation between the floor of the portion-controlled fill-pit, the top of the working level of the digester contents, and the top of the wall of the residue basin.

A further object of this invention is to provide a novel digester system which requires little, or no, conventional management inherent in prior systems in this art.

A further object of this invention is to provide with such a digester system for the effective destruction of all aerobic pathogens and viruses, through the design and implementation of the input flow detector. This feature enables the incorporation of human excrement, and other disease-bearing manures and substances, in the material available for use in the digester, and thereby includes applications that have been formerly excluded on the grounds that aerobic organisms could be dangerous if used in the process. The eradication of aerobic pathogens and viruses eliminates the danger of the spread of disease, and further, enhances the benefit of the invention when the incorporation of the residue is intended for application as a soil amendment and/or fertilizer.

It is a further object of the converter system of this invention, through the anaerobic process, to raise the pH of the undigested material from below 7 to a pH of between 7.1 and 8.5, following the digesting process of the invention. The use and benefit of the improved residue will reduce the need for the use of purchased agricultrual lime to 'sweeten' (raise the pH of the soil to that which is more conductive to crop growth) the soil in the pursuit of agricultural activities.

A further object of the converter system of this invention is to enhance the availability of both nitrogen and potassium in the residue, as compared to the avaiability of both nitrogen and potassium in the material prior to the digestion in the invention. Such benefit is most useful in agricultural activities, in that the use of said residue lessens the requirement for puchased nitrogen and purchased potassium that needs to be applied to the soil to obtain the same results in the growth of plants for food, feed, and fiber, as compared to the same soil, growing the same plants without the residue.

BRIEF DESCRIPTION OF THE DRAWINGS

FIG. 1 illustrates the device from a point of view directly above the device, and shows the width and the depth of the system including the portion-controlled fill-pit, entrance channel, the digester, the exit channel and the residue basin.

FIG. 2 illustrates the system in vertical cross-section; on the left is the portion-controlled fill-pit, in the middle is the digester, and on the right is the residue or exit basin.

DESCRIPTION OF THE PREFERRED EMBODIMENT

For the purposes of explaining the principles of the invention specific language will be used to describe the same. It will, nevertheless, be understood that no limitation of the scope of the invention is thereby intended, such alterations and further modifications in the illustrated device and in the principles of the invention being contemplated as would normally occur to one skilled in the art to which the invention relates.

FIG. 2 represents the preferred embodiment of the invention including a large central tank or container D hereafter referred to as the 'digester', which in the preferred embodiment is substantially subterranean. The digester is located between the portion-controlled fill-pit 1 and connected therewith by the entrance or charging channel 9, and the residue or exit basin 2, and connected therewith by the exit channel 8.

As material enters the digester D from the channel 9, the material is deflected away from the exit channel 8 by the input flow deflector 4. The deflector 4 is supported by braces 5, which are positioned near the top of the deflector 4 and approximately half-way between the top brace 5 and the floor 3 of the digesting area. The input flow deflector 4 is constructed such that its height does not exceed three-fourths the height of the working mass in the digesting area and is affixed to the sides of the container D defining the digesting area of the system invented. The input flow deflector 4 is a passive restraint, prohibiting fresh material coming into the digesting area to be subjected to immediate expulsion through the outlet channel 8 prior to digestion. The input flow deflector 4 thereby requires that incoming material be subjected to the anaerobic process and volcanic action before it can exit from the digesting area.

Another feature of the invention is the means of selective, mechanical agitation comprised of the agitating blades 11, the scum shredders 12, the long shaft 10a, the short shaft 10b, cross braces 16b, main brace 16a, pulleys 29, drive chain 15, electric motor 14, and electric motor mounting bracket 13.

Motor mounting bracket 13 supports an electric motor 14 which is used to provide auxiliary power whenever the operator wants to agitate the contents or shred any accumulation of scum that could accumulate at the top of the working volume of the digesting area. With the use of any suitable conventional electronic timer, or through manual operation, the operator may cause the electric motor to operate so that the drive chain 15 turns the pulleys 29 to rotate both the short shaft 10b and the long shaft 10a, which in turn rotate scum shredders 12 and agitation blades 11 in such a manner as to agitate the material and to shred scum at the selective initiation of the operator.

The digesting area is contained within the tank or container D, enclosed by the concrete floor 3, the vertical wall 6a and the slanted roof 6b. The container is enclosed in insulation 7 between the below-ground wall 6a and the excavated hole with any suitable material that is appropiate to reduce the loss of heat created by the anaerobic process. All surface areas above ground-level are coated with an epoxy-based, flat, dark paint so as to absorb the maximum available heat.

The digester tank is provided with an access ladder 18 so that whenever the system is opened for any reason, a reasonable means of access is provided through the access cover 17 to the floor 3 of the digesting area. Further provided are sampling tubes and faucets for various levels of the digesting areas. They are the upper level sampling faucet 19a, the mid-level sampling faucet 19b, and the lower-level sampling faucet 19c. It is with these sampling faucets 19a, 19b, and 19c that the operator may, selectively, take samples at different levels of the digesting slurry for the purpose of determining any appropiate information that may be desired. pH monitoring equipment 20, and other monitoring devices that may be deemed desirable, may be affixed to the tank, so various types of information about the on-going process may be obtained without interrupting the anaerobic process.

A safety valve 22 is incorporated in the design so that if a condition of any nature were to occur that could cause a dangerous buildup of pressure, the valve will release the excess pressure and keep the digester in continuous use.

A gas outlet pipe 21 is connected to the roof 6b so that the methane gas and other gasses that are produced through the anaerobic process can be channeled, preferably without substantial back pressure, to a collector/scrubber/compressor and/or burner, or the gas may be piped directly to an internal combustion engine that is designed to operate on methane gas.

Following the anaerobic process, with volcanic action, the digested material is then expelled through outlet channel 8 into outlet or exit basin 2.

It is important to the design of this invention that the floor of the portion-controlled fill-pit 1 be constructed on the same elevation as the top of the wall of the outlet basin 2 and that they, together, be positioned at an elevation equal to the point where the wall 6a of the invention joins the roof 6b of the invention. This specific embodiment achieves a natural hydraulic action created by the combined influence of the atmospheric pressure and gravity, wherein gravity seeks to equalize the weight of the opposing forces of the freshly added material, in relationship to the level (elevation) of the floor of the protion-controlled fill-pit 1, the surface of the contents of the digester, and the top of the wall of the outlet basin 2. Atmospheric pressure pushes down on the contents of the portion-controlled fill-pit 1 until a common level is obtained among the portion-controlled fill-pit, the surface of the contents of the digester, and the top of the wall of the outlet basin 2. When this takes place the hydraulic action or flow ceases, and the filling and concurrent unloading activity stabilize until additional material is added to the portion-controlled fill-pit 1.

Also, it is important that the size of the fill pit or input basin be specifically related to the capacity of the tank D when filled to its normal operating level. Typically, as explained by an example hereinafter, the volume of the input basin is relatively small, in the order of one-fortieth the volume of digesting material in tank D.

It is a further optional feature of this invention that the portion-controlled fill-pit 1 is constructed to enable the application of waste heat from any combustion device (e.g. an engine) that includes liquid cooling apparatus, by channeling the hot cooling liquid through two inch pipes 28 that are placed approximately eighteen inches apart in parallel fashion, as illustrated in FIG. 1 and FIG. 2, so that heat will transfer from the liquid to the walls and floor of the portion- controlled fill-pit 1. The purpose is to provide auxiliary heat to freshly added material to be ingested into the digesting area of the invention.

The height of the tank is selected to allow for a working level L (FIG. 2) which is in the order of twenty-one feet. It has been demonstrated that there is an optimum rate of methane gas produced per pound of material processed in the digester at this level. Additional depth of material does not contribute significantly to the rate of gas produced. The diameter of the tank D thus is selected according to the total volume needed for a given installation, with the height of the tank controlled by the aforementioned optimum for the best rate of gas production, while at the same time achieving the desired vertical volcanic action in the digesting material.

The manner of construction of the converter system would be to excavate a hole two feet in diameter larger than the diameter of the tank or container D that is to be constructed, and four feet shorter in depth than the height of the side wall 6a. At the bottom of said hole concrete forms 7 of about fifteen inches high are rested on the bottom of the hole. Midway into the concrete forms one inch steel reinforcing rods are placed, next the forms are filled with 4,000# (or better) air-entrained concrete.

Sloping trenches are then dug in such a fashion as to allow the placement of the entrance channel 9 and exit channel 8.

The top ring of the sidewall 6a is assembled from pre-machined steel with prepunched holes spaced so as to allow assembly with grade 5 or grade 8 nuts and bolts. The steel panels are curved to varying specification, to account for variable diameters of the digester, and are designed to be overlapping in assembly. After the top ring of the sidewall 6a has been assembled, the roof 6b is assembled and attached to the top ring of the sidewall 6a.

As each ring of the sidewall 6a is assembled, cable jacks commonly used in the construction trades are used to raise the roof 6b and all the preceding assembled rings that have been affixed, so that additional rings may be added for additional height, as such would be indicated for each installation.

When the appropriate height of tank has been assembled, the last ring of the side wall 6a is anchored and sealed to the concrete floor 3. Holes are cut into the sidewall 6a for the purpose of inserting, affixing and sealing entrance channel 9 and outlet channel 8 to the sidewall 6a as illustrated in FIG. 2.

Entrance channel 9 is connected to and sealed with the portion-controlled fill-pit 1, which is constructed of concrete, formed, and including two inch plastic pipe that is placed in continuous parallel fashion, as illustrated in FIG. 2, so auxiliary heat may be applied thereto after being connected to supply and return pipes. Pipe 28 is also wrapped around the entrance channel and is placed approximately one and one-half inches from the interior surface of the portion-controlled fill-pit prior to the pouring of the concrete.

The construction of the outlet basin is the same as for the portion-controlled fill-pit 1, except there is no auxiliary heat piping in the outlet basin 2.

All seams and junctures are sealed against atmospheric leaks for airtight integrity of the system prior to said system being put into operation.

The ladder 18 is bolted to the interior sidewall 6a during the assembly of the sidewall 6a. Access 17 is a manufactured access port with its design incorporated into the design of the roof 6b. The sampling faucets 19a, 19b and 19c are constructed of heavy duty, impact resistant, PVC and extend for different lengths into the digester as illustrated in FIG. 2. The pH monitoring equipment 20, which may include such optional equipment as temperature and pressure gauges, is mounted on the exterior of sidewall 6a.

The input flow deflector 4 and braces 5 are attached to the sidewall 6a of the digesting area, positioned so as to deflect away from the outlet channel 8 any freshly added material entering via inlet channel 9. This requires that freshly added material be subjected to the methogenic bacteria, volcanic action, and eventually pass over the input flow deflector 4 in order to be expelled.

Next the agitation and scum shredding apparatus, comprised of the blades 11, the scum shredders 12, the long shaft 10a, the short shaft 10b, the cross braces 16b and the main brace 16a are assembled in the digester container. The combined apparatus is assembled by conventional arc welding techniques and permanently affixed to the inside of the digester FIG. 2, except for the upper end of both shafts, which protrude through the roof 6b and are sealed at the roof 6b with suitable well-known shaft sealers. The top ends of shafts 6a and 6b are affixed to sprocket pulleys 29 and they are, in turn, fitted with drive chain 15. This shredding apparatus allows selective agitation and scum shredding whenever the operator elects to do so.

Then the safety relief valve 22 is installed into roof 6b, as illustrated in FIG. 2, and the gas outlet line 21 is constructed by cutting a four inch hole in roof 6b, and inserting a pre-sized four inch, double-sealed, flanged, sleeve in the roof 6b, and connecting the remainder of the gas outlet line 21. The gas outlet line and the double-sealed, flanged, roof connection become an integral unit (represented by the same numeral 21), which permits the continuous transfer of methane gas and other gasses produced, to any suitable storage facility.

The portion-controlled fill-pit 1 is constructed by determining the specific capacity of the digesting area of the digester D and setting forms for the floor and walls of the portion-controlled fill-pit 1. Into these forms are inserted two inch plastic pipe 28, approximately eighteen inches apart, in a continuously parallel manner, and approximately one and one-half inches form the interior surface of the portion-controlled fill-pit 1. This pipe 28 will be exposed approximately four inches outside the forms for the purpose of attaching flexible tubing at a later date if desired, so that auxiliary heat may be obtained to warm the material to be added to the contents of the digester.

Following the forming and placing of the piping 28, concrete is filled into forms, through which the entrance channel 9 protrudes approximately two inches above the floor of the portion-controlled fill-pit 1. Upon curing of the concrete and removal of the forms, the optional plexiglas lid 1b is affixed to the top of the fill-pit 1 with galvanized steel hinges placed approximately every three feet.

Using the system involves first establishing a specific location from which it will be operated. For purposes of explaining a typical example, assume the system is to be operated on a typical American dairy farm with one hundred dairy cows.

The current practice of such a farmer is to scrape his holding areas at least once, and sometimes twice, a day for the purpose of sanitation and/or to maintain a manageable amount of manure consistant with the practice of preserving the fertilizer value of said manure. In doing so, the farmer will generally deposit many bucket-loads of manure into pits for pumping or draining into lagoons, to be later siphoned out, or pumped out, and sprayed/spread on his crop fields and incorporated through cultivation into the soil.

Instead of dumping those bucket loads of manure directly into a pit to be pumped or drained into a lagoon for storage, the manure is loaded into the portion-controlled fill-pit on some regular basis. Under normal operation, such operator action, and unloading of the residue basin, is all that is required to operate the system.

The effect is to put into operation atmospheric pressure and gravity. The specific positioning (e.g. relative elevation) of the floor of the portion-controlled fill-pit 1 and the top of the wall of outlet basin 2, in combination with the essentially liquid consistency of material put into the digester D, forces the contents of the portion-controlled fill-pit 1 to move through the entrance channel 9 into the digesting area, and because of the positioning of the exit channel 9 from the digester D, the contents nearest the exit channel 8, between wall 6a and the deflector plate 4, are forced out the outlet channel 8 into the outlet basin 2.

The capacities are designed such that in the process only material that has been in the processing state for a period of approximately forty days, and therefore thoroughly digested, is expelled from the digester. As the freshly added material travels through the entrance channel 9 and into the digesting area, it is subjected to elimination of its oxygen content, is attacked by methogenic bacteria, and subjected to the natural volcanic action inherent in the methogenic process. Such volcanic action mixes the contents, for the majority of the time without assistance that usually involves the use of auxiliary power, and is ultimately expelled as described above.

The system will produce usable methane gas, and other gases, which can be used in the fueling of internal combustion engines that may, in turn, power alternating current electrical generators or for any other suitable purpose.

It is to be understood that although a vertical action digester tank D has been illustrated, the various features of the disclosed invention are well suited to virtually every type of vertical and/or single stage digester design. Various materials and construction/connection techniques are possible, the most appropriate materials and dimensions will depend, in part, on the amount or production desired and on the size, style and application of the invention.

Thus, while the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An anaerobic digester system for biodegradable materials, comprising
    a closed digester tank having a predetermined volume, said tank including a gas collecting region at the top thereof above the normal liquid level of said tank and means for removing gases from said region,
    means providing an inlet means to and an outlet means from said digester tank,
    deflector means in said digester tank inhibiting direct flow from said inlet means to said outlet means,
    an input basin having a relatively small volume with respect to said tank,
    means connecting said input basin for gravity flow of contents by atmospheric pressure to said inlet means of said digester tank,
    an outlet basin having a volume no less than said input basin,
    means connecting said outlet means of said digester tank to said outlet basin, said outlet basin being located with its top approximately at the same level as the normal liquid level of said digester tank, whereby anaerobically digestable material may be loaded into said input basin and will proceed by gravity and atmospheric pressure into said digester tank, the effluent of digested material will flow into said outlet basin, and gases resulting from the digestion will rise through the material and agitate the same and then proceed to said gas collecting region.

2. A digester system as defined in claim 1, wherein said digester tank has a normal liquid level in the order of twenty-one feet.

3. A digester system as defined in claim 1, wherein said digester tank is substantially buried in the ground and said basins are ground supported.

4. A digester system as defined in claim 1, including means for heating said input basin and said inlet means.

5. A digester system as defined in claim 1, including means for selectively mechanically agitating material in said digester tank.

6. A digester system as defined in claim 1, wherein said means providing said inlet and said outlet are straight conduits between the lower region of said digester tank and the respective said basins.

7. An anaerobic digester system for biodegradable materials, comprising a closed digester tank having top and bottom walls spaced along a central axis and a cylindrical side wall joined to said top and botton walls, said tank being supported with its axis vertical and with the majority of its height below ground, said tank including a gas collecting region at the top thereof above a predetermined normal liquid level within said tank, means defining spaced inlet and outlet openings in said tank near said bottom and substantially straight inlet and outlet channel means connected to said openings providing a flow inlet to and a flow outlet from said digester tank, deflector means in said digester tank surrounding said outlet opening and inhibiting direct flow from said inlet to said outlet while allowing digested material to proceed to said flow outlet, an input basin having a relatively small volume with respect to said tank and supported with its bottom at the predetermined normal liquid level in said digester tank, means connecting said input basin to said inlet channel means for gravity flow of material loaded into said input basin under atmospheric pressure through said inlet channel into said digester tank, an outlet basin connected to said outlet channel and having a volume no less than said input basin, said outlet basin being located with its top approximately at the same level as the normal liquid level of said digester tank, whereby anaerobically digestable material may be loaded into said input basin and will proceed by gravity and atmospheric pressure into said digester tank, the effluent of digested material will flow into said outlet basin, and gases resulting from the digestion will rise through the material and agitate the same and then proceed to said gas collecting region, and means for removing gases from said gas collecting region.

* * * * *